(12) United States Patent
Guerra et al.

(10) Patent No.: US 6,665,245 B1
(45) Date of Patent: Dec. 16, 2003

(54) OPTICAL DISK INITIALIZATION METHOD AND APPARATUS

(75) Inventors: John M. Guerra, Concord, MA (US); Dmitri Vezenov, Natick, MA (US)

(73) Assignee: Calimetrics, Alameda, CA (US)

( * ) Notice: Subject to any disclaimer, the term of this patent is extended or adjusted under 35 U.S.C. 154(b) by 425 days.

(21) Appl. No.: 09/746,748

(22) Filed: Dec. 22, 2000

(51) Int. Cl.$^7$ .................................................. G11B 7/00
(52) U.S. Cl. ................................. 369/47.55; 369/53.37
(58) Field of Search .............................. 369/116, 53.45, 369/47.49, 47.5, 47.55, 53.37

(56) References Cited

U.S. PATENT DOCUMENTS 5,684,778 A    11/1997  Yamada et al.
6,060,221 A  *  5/2000  Furukawa et al. .......... 369/116
6,452,891 B1 *  9/2002  Hennessey ................. 369/116

* cited by examiner

Primary Examiner—Nabil Hindi
(74) Attorney, Agent, or Firm—Knobbe Martens Olson & Bear LLP

(57) ABSTRACT

A method and apparatus for initializing an optical recording medium comprising a phase change material using a series of flashes of light. A series of low-power, high duty cycle flashes of light are produced to initialize the media to a crystalline form, onto which data may be recorded. In accordance with another aspect of this invention, a spiral flash bulb with centrally located connectors comprises the flash illumination source for initializing the optical recording media.

29 Claims, 2 Drawing Sheets

SDR 0.93%

OPTICAL DISK INITIALIZATION METHOD AND APPARATUS

BACKGROUND OF THE INVENTION

1. Field of the Invention

The invention relates to processes of initializing disks for optical data storage.

2. Description of the Related Art

In a phase transformation optical recording medium, data is generally recorded by transforming the phase of each recording bit of the recording layer from a crystalline state to an amorphous state. In general, since recording is conducted using phase transition between the two states, the phase of the recording thin film should be converted to the crystal phase in advance. This operation is called initialization, signifying the transformation of the whole recording region on the recording layer to the crystalline state prior to the recording of data. One method of initialization, typically referred to as serial processing, uses a laser beam for initialization. With this method, a laser light spot of from several tens to several hundreds of $\mu$m in diameter is formed with the output far greater than that of a typical laser diode for recording and reproduction. By irradiating and rotating the media at a constant speed, many tracks can be crystallized in a single operation. This method has the advantage that the medium is heated in a small area at a time, reducing thermal load and the consequent risk of material cracking. However, because only a small area is illuminated at any one time, this method has the disadvantage that initialization of an entire disk takes a long time. To overcome some of the difficulties associated with serial methods of optical initialization, flash methods of initialization have been developed. By irradiating the media with a flash lamp, the recording layer across the entire surface of the optical recording medium can be initialized simultaneously. With initialization by flash irradiation, the initialization itself may be completed in a period of only several milliseconds. One problem with this method, however, is that the recording medium is heated at once, producing thermal induced internal stresses that increase the likelihood of thermal damage to both the substrate and the coating, such as warping, cracking, and other forms of distortion. In U.S. Pat. No. 5,684,778 to Yamada et al., this problem is addressed by controlling the duration of the flash. As the flash duration decreases, however, flash intensity must be increased to successfully produce the desired phase change in the recording material. This requires a resulting increase in power supply capacity and expense, and also increases the time required to charge the flash capacitor, thereby slowing any process of sequential initialization of disks during the disk manufacturing process. Other attempted solutions include the use of a complex thermal heat management platten. Another problem with the flash initialization method is that the uniformity of initialization over the disk surface is difficult to produce. Spatial non-uniformity in the light intensity of the flash produces non-uniform initialization. In addition, the structure of the disk results in a reflectivity profile which varies significantly depending on wavelength and angle of incidence. A single flash, therefore, will typically produce a non-uniform initialization that has heretofore been unacceptable for the production of optical disks intended for high density data storage. Making the illumination more uniform with, for example, an optical tunnel is very inefficient and requires higher input flash power with the associated problems outlined above.

SUMMARY OF THE INVENTION

The present invention relates to a method of initializing an optical recording media. In preferred embodiments, this process will comprise the exposure of the media to at least two flashes of light. These flashes are preferably less than about five hundred micro-seconds in duration, and are preferably repeated at a rate of at least one flash per second. In other embodiments, the flashes may be repeated five or more times, and for 100 to 200 microseconds per flash. These repetitions may occur as frequently as 10 to 50 flashes per second. For example, five 150 microsecond flashes repeated at a rate of 30 Hz.

In accordance with another aspect of this invention, an apparatus is provided for initializing optical recording media. This apparatus preferably comprises one or more flashbulbs, a support for the media to allow adjustable proximaty to the flashbulbs which may be rotatable (for off-line initialization) or a support for the flash head that allows adjustable proximity to the media for in-line initialization, a capacitor, a charging circuit, a switching circuit coupling the capacitor to the charging circuit. Additionally, the control circuit is preferably configured to repetitively charge the capacitor with the charging circuit and to discharge the capacitor through one or more of the flashbulbs at a rate of at least about one discharging and charging cycle per second. In preferred embodiments, the flashbulbs may be a spiral shape. Preferably, the spiral begins with a connector proximate to the center of the spiral, and ends with a connector proximate to the center of the spiral as well.

In accordance with another aspect of this invention, a method is provided for initializing optical recording media comprising exposing a layer of material of the media to a series of two or more low energy, high duty-cycle flashes of light. In further embodiments, this method may comprise a series of two or more low energy, high duty-cycle flashes of light wherein each of the flashes has sufficient intensity and duration to only partially crystallize the layer of material.

In another preferred embodiment of this invention, an apparatus for initializing an optical recording medium is provided comprising a flashbulb having a substantially spiral shape, wherein the spiral begins and terminates proximate to the geometric center of the spiral, or terminates at the outside diameter, and wherein the spiral has an overall diameter which is approximately equal to or larger than the diameter of said recording media. A support for the media aligned with the flashbulb.

In yet another preferred embodiment of this invention provides for an optical recording media made a process comprising the steps of positioning the media proximate to a flashbulb and exposing the media to a series of two or more flashes from the flashbulb, wherein each flash successively increases a crystallization state of a layer of material on the media, or the fraction of the crystallized area on the disc, and wherein the layer of material is substantially completely crystallized by the series of flashes within approximately five seconds.

DETAILED DESCRIPTION OF THE PREFERRED EMBODIMENT

Figure 1:
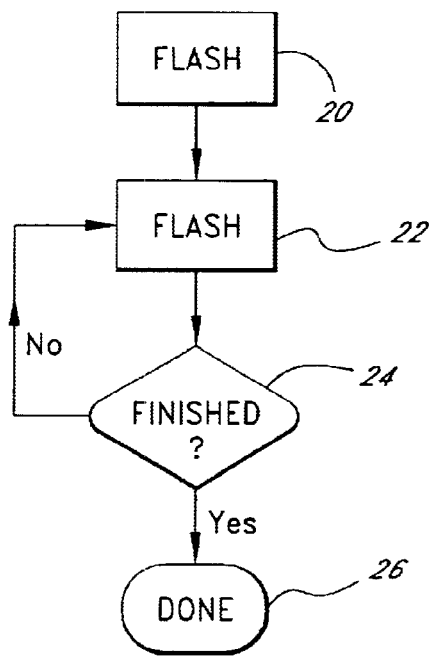
FIG. 1 is a flow chart of an initialization process in accordnace with one embodiment of the invention.

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The present invention avoids many of the disadvantages of prior art initialization methods with the use of at least two separate and independent approaches. One approach advantageously initializes the media with a series of multiple short duration flashes rather than a single flash. Preferably, the pulses of the series each have an energy too low to completely crystallize the media, and are applied at a high duty cycle such that complete crystallization is performed within about five seconds.

In general one needs to supply a pulse that is longer than the crystallization time of the phase change material, typically greater than 90 nano-seconds, but less than a millisecond and preferably on the order of 100 micro-seconds. Above about one millisecond, the medium will either not initialize at all or will crack for any flash intensity delivered. Below a millisecond, one can find a combination of intensity and pulse duration and number of pulses that will intialize a given phase change medium. One way of understanding this is in terms of controlling surface energy. If too much light energy is delivered to the medium, any energy in excess of that required to crystallize (initalize) the medium goes into surface heating, resulting in cracks in the coating. Therefore, controlling the surface energy to just that required for initialization prevents the formation of cracks.

One may also understand the success of this short multi-pulse flash method in terms of thermal dissipation and relaxation. The reason that the laser serial intialization works is that the local heating is quick as the small laser spot moves by, allowing equally quick dissipation of the heat and the coating to "relax" before thermal damage to the coating can occur. In our short multi-pulse flash method, the entire surface is exposed at once but the short duration of the pulse allows the heat to quickly dissipate, thereby preventing damage to either the coating or the substrate.

In some optical recording schemes it is desired to write higher reflectance crystallized marks into a darker substantially amorphous medium. The flash method for this case is stopped short of full initialization, thereby leaving the medium substantially amorphous but in a so-called primed condition, in which very small seeds for crystallization growth have been formed. With the medium in this state, one may write marks that are smaller than would be possible otherwise, and with less energy. The flash initialization method is similarly advantageous for priming medium as well therefore. It can be seen that with our multi-pulse method the priming can be controlled easily, compared to a single flash method or to a scanned laser method.

In addition to this multiple flash technique, several features are provided to increase the uniformity of the initialization. These include, for example novel light sources and reflective components that enhance the spatial uniformity of flash intensity.

FIG. 1 is a flow chart that describes one embodiment of a process of initializing an optical recording media. The first step 20 involves exposing the media to a first flash of light. As described above, the flash at step 20 may comprise a relatively low power, short duration pulse of light. Flash duration is preferably controlled so as to be less than about 1 millisecond, with approximately 150 microseconds having been found suitable in one embodiment. The first flash at step 20 is followed by a second flash at block 22 after a delay period. To perform the initialization process quickly, it is advantageous for the delay to be less than about one second. In preferred embodiments, this delay is less than about 100 milliseconds. In one specific embodiment, the delay is about 33 milliseconds, corresponding to a flash duty cycle of approximately 30 Hz. The second flash 22 will generally be approximately equal to the first in intensity and duration, although variations in these flash parameters are possible and may be desired in some applications.

At step 24 a determination is made as to whether or not further flashes of light are required. In preferred embodiments, the number of flashes may be predetermined, and the only factor in the decision at block 24 is whether or not the flash count has reached the desired number. It will be appreciated that there is large latitude afforded by the flash initialization method and apparatus in that the medium typically cannot be over-initialized. The flash output and pulse length and number of pulses can be determined for a given medium beforehand, and then an extra number of pulses can be supplied in production to allow for manufacturing variances in the coating or medium. In this way the initialization is saturated and any over-pulsing does no damage as long as the initial parameters are set correctly with a sample disc.

The number of pulses, duration of the pulses, and intensity of the pulses (and/or proximity between the flash and the media) needs to be determined for different phase change stack recipes, whether the differences are in the design coating thickness or different phase change materials altogether (AIST vs. GST for example), or manufacturing variances. In general, however, the adjustment required is minor.

In some alternative embodiments, however, a monitoring system may be queried as to the condition of the media during step 24. This monitoring system may be optical in nature. For example, it may directly scan the surface of the media using a laser, or the equivalent, or the system may use machine vision techniques to ascertain whether or not the initialization process is complete.

If a further flash of light is determined to be required during step 24, the system will return to step 24 and produce another flash. Subsequently, the process will continue to loop back to step 22 until it is determined that another flash of light is no longer required. When the flash is no longer required, the process ends at block 26.

Figure 2:
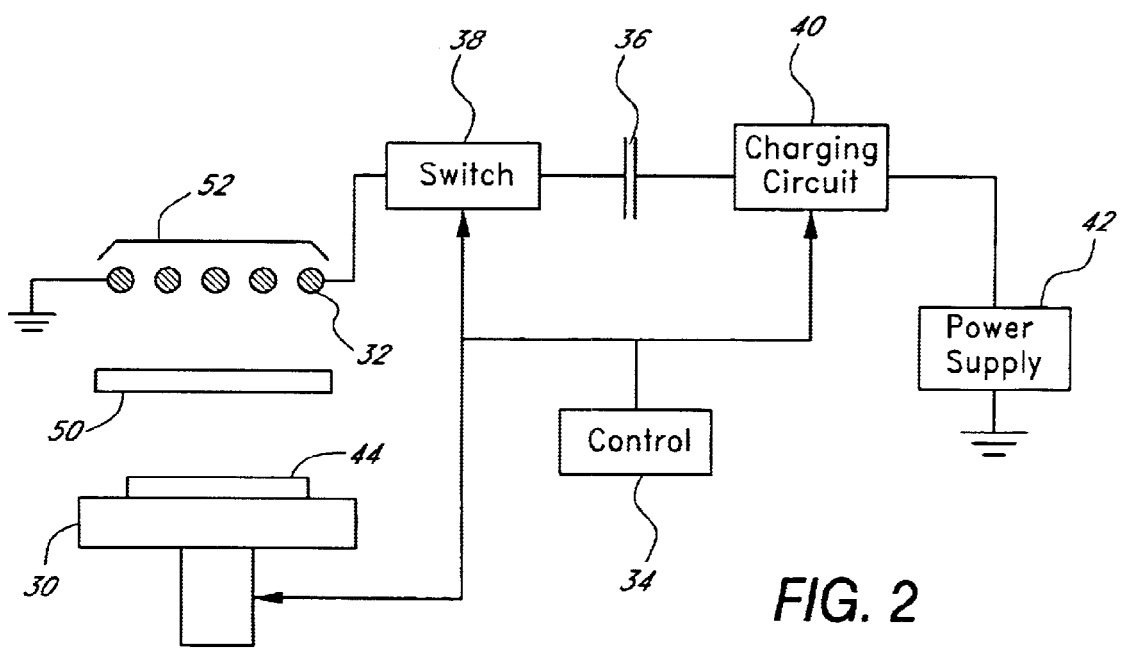
FIG. 2 is a block diagram of an apparatus for initializing optical recording media.

FIG. 2 shows a block diagram of one embodiment of an apparatus for initializing optical recording media. This apparatus preferably comprises a support 30, a flashbulb 32, control circuitry 34, capacitor 36, switch 38, charging circuitry 40, and power supply 42. The support 30 supports the media 44 proximate to the flashbulb 32, and positions the media 44 to a preferred location during the initialization process. The media 44 may, for example, be mounted about one inch from the flashbulb 32. The power supply 42 is connected electrically to the charging circuitry 40, which regulates the charging current and voltage which is supplied to the capacitor 36. The capacitor 36 is in series with the charging circuitry 40, as well as the switch 38. The switch 38 functions to discharge the capacitor 36 through the flash bulb 32, thereby creating a flash of light. To control capacitor charging and switching of the capacitor, the control circuitry 34 is connected electrically to the switch 38 and the charging circuitry 40.

The control circuitry 34 is advantageously configured to control the pattern, duration, and intensity of the flashes of light. As described above, the control circuitry 34 may be configured to perform at least one capacitor charge and discharge cycle per second so as to produce at least approximately one flash per second. The control circuit 34 may also be coupled to the support 30 so as to control and alter the orientation of the media 44 during the initialization process. In one embodiment, the support 30 is rotated up to 90 degrees between each flash. In other embodiments, the support is rotated up to 90 degrees every two flashes. The rotation may be continuous or stepwise.

In some cases, the material to be initialized is manufactured as a continuous thin sheet or web. In this case, the flashbulb 32 can be positioned over the web and flashed continuously at, for example, the 30 Hz repetition rate described above. In this embodiment, the web can be scrolled beneath the flashbulb 32 at a rate that exposes each portion of the media to the desired number of flashes as it passes under the flashbulb 32.

There are a variety of flashbulbs, fixtures, and charging/discharging apparatus currently on the market that are suitable for use with the present invention in the system illustrated in FIG. 2. In contrast with prior art flash initialization methods, each flash has a relatively low intensity and short duration. Thus, only a relatively small amount of energy need be stored in the capacitor between flashes. This allows for a very short charging time, which in turn allows for a high flash duty cycle, and very fast initialization. Five flashes at 30 Hz, for example, will initialize the media in less than 170 milliseconds and may be repeated on subsequent disks essentially immediately with a single initialization apparatus, as compared to several seconds or even minutes per disk with a single apparatus in prior art techniques.

On a micro-scale, the uniformity from the flash illumination is again superior to the micro-scale uniformity obtained with a scanned laser spot for two reasons. First, the light from the flash is incoherent so there is none of the interference speckle patterning inherent to a coherent laser source. Second, the flash illumination is whole-field, so there are none of the remnant scanning tracks from the laser (even with careful overlap of the scanned laser tracks, there remain substantial non-uniformities on this micro-scale).

Figure 3A:
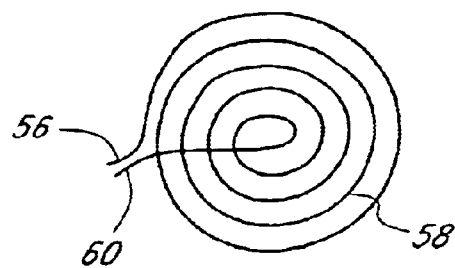
FIG. 3A is a plan view of a prior-art spiral shaped flashbulb having connectors near the edge of the spiral.

As mentioned above, producing a uniform field of illumination with the flash of light is highly desirable, while maintaining optical efficiency to avoid higher power requirements, and thereby longer charge times, for the flash. This is accomplished through careful design of the flash tube itself to greatly enhance the uniformity of the initialization process. FIG. 3A shows a prior art arrangement of a spiral shaped flash bulb. This spiral begins with a first connector 56 proximate to an outer edge of the flash bulb. The tube 58 then winds in a largely circular fashion toward the center of the spiral. Upon reaching a specific inner diameter, the tube 58 is then brought back out of the spiral, typically beneath the exposure surface of the flash bulb, to place the final connector 60 proximate to the first connector 56. In this prior art flash bulb, asymmetric intensity patterns are generated near the outside edge of the flashbulb corresponding to the location of the connectors 56, 60 on the tube. Because the recordable media extends radially from the center to the edge of the disc, intensity fluctuations near the edge of the media jeopardize the uniformity of the initialization process near those locations.

Figure 3B:
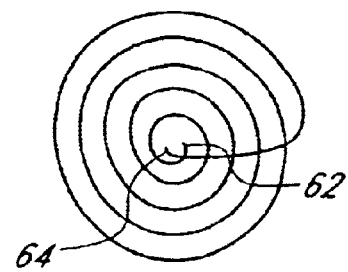
FIG. 3B is a plan view of a spiral shaped flash-bulb having connectors near the center of the spiral.

FIG. 3B shows a flashbulb arranged in accordance with one embodiment of the invention having connectors 62, 64 proximate to the center of the flash bulb. In use, the intensity fluctuations which may be caused by the connectors 62, 64, or the variations of the tube proximate to the connectors 62, 64, do not affect the initialization process as much because the center of the optical disc typically comprises a hole or opening in the center, rather than optically recordable media.

Figure 3C:
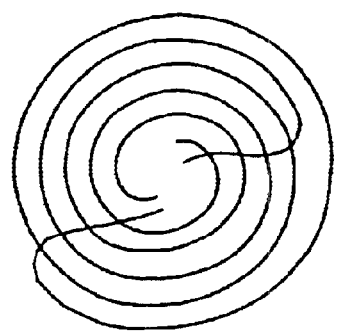
FIG. 3C is a schematic of another spiral shaped flash-bulb comprising two separate tubes, and having connectors near the center of the spiral.

It has also been noted that intensity fluctuations are caused by the spatial separation between loops of the spiral. FIG. 3C shows a flash tube arranged in accordance with another embodiment of the invention which serves to reduce this source of non-uniformity. In this embodiment, the flash bulb comprises two independent tubes wound in a concentric spiral configuration. Each tube has a first and second connector, both of which are proximate to the center of the spiral for reasons disclosed above. Additional preferred embodiments may comprise flash tubes of small diameter, and wound in more frequent spirals. Further preferred embodiments comprise different diameter tube wound around a common center. Additionally, the number of element that comprise the flash bulb may be numerous, for example, three filaments all with different radii tubes wound around a common center, terminating proximate to the center of the spiral.

Additional uniformity is obtained because the medium itself is close to the flash, and so it serves to partially reflect light back to a flash reflector 52 that may be provided on the opposite side of the flash bulb, and thus forming part of a multiple reflection mirror box that increase uniformity by multiple reflections between the disk and the flash lamp. The reflector 52 may comprise a stippled surface to increase the diffusivity of the reflector during operation, Additionally, a protective glass or quartz plate 50 on the flash head may be made with a small diffusivity, such that as the light passes through the plate 50, the diffusion contributes to the uniformity of the incident light. In other preferred embodiments of this plate 50, the plate 50 comprises a coating that has an optimum reflection/transmission profile for various regions of the plate 50 matching that of the media and for different wavelengths to optimize the absorption by the media during initialization. And in yet another embodiment of this plate, a locally varied neutral density filter is formed to absorb light more strongly in the higher intensity part of the flash output and less strongly in the area of the tube with lower output. Such a filter is easily made in exact calibration to the tube by using the tube itself to make it. A photographic plate or other photsensitive material is place on the tube and exposed and then developed or otherwise "fixed" to prevent further changes upon subsequent exposure. This plate is then returned to the flash head and aligned with it just as before, thereby making the light output uniform. However, efficiency suffers in this scheme.

Finally, a proximity mask can be placed against the medium, in which the mask has prefabricated patterns that upon exposure with the flash are imprinted onto the optical medium. The pattern can include micro-scale information such as formatting and tracking information, or more macro-scale information such as company logos, identification numbers, designs, or security codes including bar codes.

EXAMPLE

A DVD-RW disk comprising a layer of phase change recordable material of AIST in a substantially amorphous state was exposed to a series of five 150 microsecond flashes of light at a duty cycle of 30 Hz (i.e. about 33 milliseconds between flashes) using a Xenon Corp. RC-747 flashlamp with the XL-1890 spiral tube mounted within. About 207 Joules of stored electrical energy was discharged through the lamp fixture with each flash. A highly uniform crystallized state was observed following the treatment, as illustrated in FIG. 4.

Figure 4:
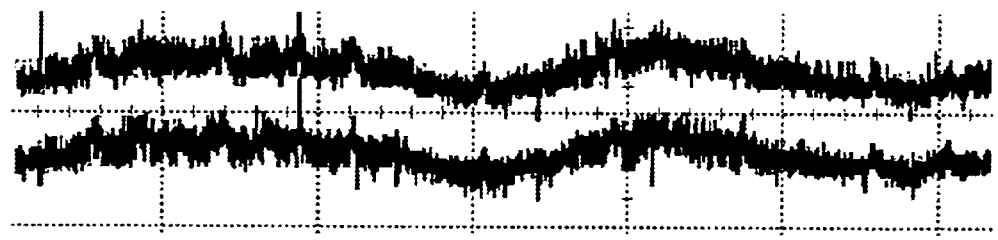
FIG. 4 is a measurement of reflectivity along two tracks of an optical recording media, after the media has been initialized in accordance with one embodiment of the invention.

FIG. 4 is a graph of measured reflectivity along two different tracks around the disk after this initialization treatment. Each trace was collected using an Infinium scope in peak detect mode. The measured SDR was 0.93%. The smoother trace and lower SDR value indicates that the medium is much more uniform on a micro-scale, which again results from the whole-field illumination form the large area flash, as compared to the serial scanned spot of a laser initializer.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of initializing an optical recording medium comprising:

exposing said medium to a flash of light from a light source, said flash of light having a duration of about 100–200 micro-seconds; and repeating said exposure one or more additional times, such that said media is exposed to five or more 100 to 200 micro-second flashes at a repetition rate of approximately 10 to 50 flashes per second.

2. The method of claim 1, comprising exposing said media to five approximately 150 micro-second flashes produced at a repetition rate of approximately 30 flashes per second.

3. The method of claim 1 wherein the process is stopped before initialization is complete to prime the surface for writing crystalized marks on amorphous medium.

4. The method of claim 1 further comprising the step of rotating said media during said exposing.

5. An apparatus for initializing an optical recording media comprising:

one or more flashbulbs;

a rotatable support configured to hold said media in approximate alignment with said one or more flashbulbs or;

a capacitor;

a charging circuit;

a switching circuit coupling said capacitor to said charging circuit and to said one or more flashbulbs;

a control circuit configured to repetitively charge said capacitor with said charging circuit and to discharge said capacitor through said one or more flashbulbs at a rate of at least about one discharging and charging cycle per second.

6. An apparatus for initializing an optical recording media comprising:

one or more flashbulbs in a spiral configuration having ends located proximate to the center of the spiral a support configured to hold said media in approximate alignment with said one or more flashbulbs or;

a capacitor;

a charging circuit;

a switching circuit coupling said capacitor to said charging circuit and to said one or more flashbulbs;

a control circuit configured to repetitively charge said capacitor with said charging circuit and to discharge said capacitor through said one or more flashbulbs at a rate of at least about one discharging and charging cycle per second.

7. An apparatus for initializing an optical recording media comprising:

one or more flashbulbs in a spiral configuration additionally comprising a transparent or semi-transparent plate between said flashbulb and said media a support configured to hold said media in approximate alignment with said one or more flashbulbs or;

a capacitor;

a charging circuit;

a switching circuit coupling said capacitor to said charging circuit and to said one or more flashbulbs;

a control circuit configured to repetitively charge said capacitor with said charging circuit and to discharge said capacitor through said one or more flashbulbs at a rate of at least about one discharging and charging cycle per second.

8. The apparatus of claim 7, wherein said plate is diffusing, wavelength-selective, or a variable neutral density filter.

9. The apparatus of claim 8, wherein said plate comprises a variable neutral density filter and wherein said variable neutral density filter is formed by exposure of a photosensitive material to the flash.

10. The apparatus of claim 5 wherein the outside diameter of the flashbulb is larger than the outside diameter of the medium in order to assure proper illumination uniformity at the outside parts of the medium.

11. An apparatus for initializing an optical recording media comprising:

one or more flashbulbs in a spiral configuration;

a support configured to hold said media in approximate alignment with said one or more flashbulbs;

a capacitor;

a charging circuit;

a switching circuit coupling said capacitor to said charging circuit and to said one or more flashbulbs;

a control circuit configured to repetitively charge said capacitor with said charging circuit and to discharge said capacitor through said one or more flashbulbs, wherein said control circuit is configured to expose said media to five or more 100 to 200 micro-second flashes at a repetition rate of approximately 10 to 50 flashes per second.

12. The apparatus of claim 11, wherein said control circuit is configured to expose said media to five approximately 150 micro-second flashes produced at a repetition rate of approximately 30 flashes per second.

13. An apparatus for initializing an optical recording media comprising:

one or more flashbulbs in a spiral configuration;

a support configured to hold said media in approximate alignment with said one or more flashbulbs or;

a capacitor;

a charging circuit;

a switching circuit coupling said capacitor to said charging circuit and to said one or more flashbulbs;

a control circuit configured to repetitively charge said capacitor with said charging circuit and to discharge said capacitor through said one or more flashbulbs at a rate of at least about one discharging and charging cycle per second wherein said control circuit is configured to stop initialization before initialization is complete to prime the surface for writing crystalized marks on amorphous medium.

14. A method of initializing an optical recording media comprising exposing a layer of material on said media to a series of two or more low energy, high duty-cycle flashes of light, wherein each of said flashes has sufficient intensity and duration to only partially crystallize said layer of material; and wherein said duty cycle is high enough to substantially completely crystallize said layer of material within approximately five seconds.

15. The method of claim 14, wherein said duration is less than about 500 micro-seconds, and said duty cycle is more than about 10 flashes per second.

16. A method of initializing an optical recording media comprising exposing a layer of material on said media to a series of two or more low energy, high duty-cycle flashes of light by discharging less than about 300 Joules of electrical energy in a flashbulb with each flash.

17. An apparatus for initializing an optical recording medium comprising:

a flashbulb of substantially spiral shape, wherein said spiral begins and terminates proximate to the geometric center of said spiral, and wherein said spiral has an overall diameter which is approximately equal to or larger than the diameter of said recording media; and a rotatable support for said media aligned with said flashbulb.

18. An apparatus for initializing an optical recording medium comprising:

a flashbulb of substantially spiral shape, wherein said spiral begins and terminates proximate to the geometric center of said spiral and wherein said spiral has an overall diameter which is approximately equal to or larger than the diameter of said recording media; and a support for said media aligned with said flashbulb; and a diffuse reflector located on the side of the flashbulb opposite the media.

19. An apparatus for initializing an optical recording medium comprising:

a flashbulb of substantially spiral shape, wherein said spiral begins and terminates proximate to the geometric center of said spiral, and wherein said spiral has an overall diameter which is approximately equal to or larger than the diameter of said recording media; and a support for said media aligned with said flashbulb; and a semi-transparent filter positioned between said flashbulb and said media.

20. An apparatus for initializing an optical recording medium comprising:

a flashbulb of substantially spiral shape, wherein said spiral begins and terminates proximate to the geometric center of said spiral, and wherein said spiral has an overall diameter which is approximately equal to or larger than the diameter of said recording media wherein said flashbulb further comprises a second tube wound in a complimentary spiral, and having terminals proximate to said first terminals of said first flashbulb; and a rotatable support for said media aligned with said flashbulb.

21. An optical recording media made a process comprising:

positioning said media proximate to a flashbulb; and exposing said media to a series of two or more flashes from said flashbulb, wherein each flash successively increases a crystallization state of a layer of material on said media, and wherein said layer of material is substantially completely crystallized by said series of flashes within approximately five seconds.

22. The method of claim 21, wherein said exposing comprises exposing said media to at least five flashes at a duty cycle of at least about 10 flashes per second.

23. The method of claim 21, additionally comprising rotating said media during said exposing.

24. An apparatus for initializing an optical recording media comprising:

a flashbulb;

a media support aligned with said flashbulb;

means for controlling said flashbulb so as to expose said media to a series of flashes from said flashbulb at a rate of at least about 10 flashes per second.

25. The apparatus of claim 24, wherein said media support is rotatable.

26. A method of partially initializing an optical recording media comprising:

exposing said media to a first flash of light, said flash of light having a duration of less than about five hundred micro-seconds; and repeating said exposure one or more additional times at a rate of at least about one flash per second stopping the exposure before full initialization is reached so that the medium is in a primed state for writing crystallized marks into a substantially amorphous medium, where the prime state allows smaller marks to be made.

27. An apparatus for selectively initializing an optical recording media comprising:

a flashbulb;

a media support aligned with said flashbulb;

a patterned mask of varying optical transmission a support to hold said mask proximate to and aligned with the medium means for controlling said flashbulb so as to expose said media to a series of flashes from said flashbulb at a rate of at least about 10 flashes per second.

28. The apparatus of claim 27, wherein said patterned mask contains micro-information including formatting and tracking and data information.

29. The apparatus of claim 27 wherein said patterned mask contains macro-information including company logos, bar codes, designs or other.

\* \* \* \* \*